Figure 1:
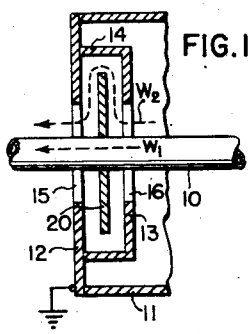

Dec. 21, 1948.  H. A. WHEELER  2,456,803

HIGH-FREQUENCY ENERGY LEAKAGE SUPPRESSOR

Filed March 15, 1946  2 Sheets-Sheet 1

*INVENTOR:*
HAROLD A. WHEELER,
BY
ATTORNEY.

Dec. 21, 1948. H. A. WHEELER 2,456,803
HIGH-FREQUENCY ENERGY LEAKAGE SUPPRESSOR
Filed March 15, 1946 2 Sheets-Sheet 2
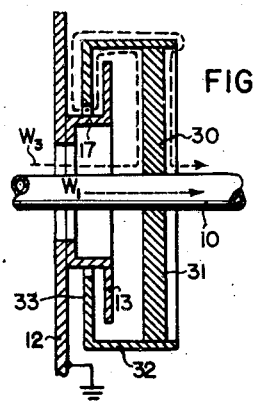
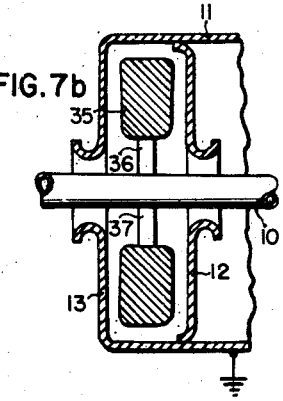
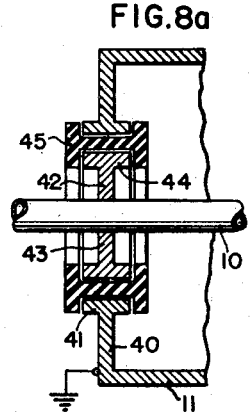
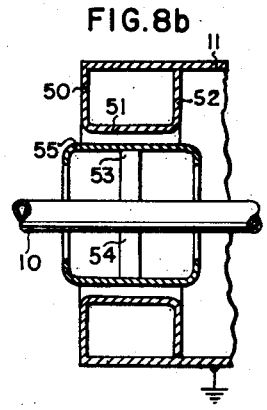
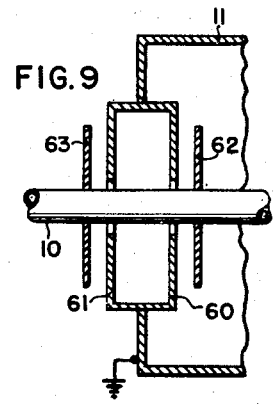
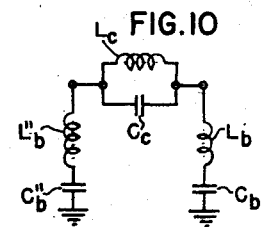
INVENTOR:
HAROLD A. WHEELER,
BY
ATTORNEY.

Patented Dec. 21, 1948

2,456,803

UNITED STATES PATENT OFFICE 2,456,803

HIGH-FREQUENCY ENERGY LEAKAGE SUPPRESSOR

Harold A. Wheeler, Great Neck, N. Y., assignor, by mesne assignments, to Hazeltine Research, Inc., Chicago, Ill., a corporation of Illinois Application March 15, 1946, Serial No. 654,566

11 Claims. (Cl. 178—44)

This invention is directed to a by-pass arrangement for a conductor of electrical currents and is especially suited for by-passing a conductor which projects or feeds through an aperture in a conductive shield.

The problem of by-passing such a feed-through conductor is frequently encountered in the communication field. Consider, for example, a signal-translating system comprising a triode vacuum tube and an associated cavity resonator, having the form of a resonant coaxial transmission-line section. A resonator of the type mentioned includes an inner conductor and a coaxially aligned hollow outer conductor, serving as a shield for the inner conductor. Usually, the line section is open at one end and the tube is inserted therein in a manner to connect its anode and control electrode to the inner and outer line conductors, respectively. The opposite end of the line is often short-circuited to establish an effective electrical length equal to one-quarter of a desired operating wave length at which the line exhibits impedance properties analogous to those of a parallel-resonant circuit. The short-circuiting element effectively comprises a portion of the shield and has an aperture through which the inner conductor projects to connect the tube anode with a source of space current. As in conventional circuit practice, it is desirable to by-pass the space current source at the operating frequency of the system. To this end, it has been proposed that a circular conductive disc be coaxially connected with the inner conductor in the vicinity of the short-circuiting portion of the shield to form therewith a by-pass condenser. Such a disc provides only a single path of coupling through the shield aperture. It does not achieve the degree of by-passing obtainable with an arrangement affording at least two parallel paths of coupling through which signals desired to be by-passed are transmitted in phase opposition.

Another prior by-pass arrangement similar to that described above, includes a hollow conductive cylinder electrically connected to and supported in the aperture of the shield. The inner conductor projects through and is spaced from the walls of the cylinder so that together they constitute a by-pass condenser. Arrangements of this type also provide but a single path of coupling and are subject to the limitation expressed in the preceding paragraph.

It is an object of the present invention, therefore, to provide a by-pass arrangement which avoids the aforementioned limitations of the described prior devices.

It is another object of the invention to provide an improved by-pass arrangement for a feed-through conductor of electrical currents.

It is a specific object of the invention to provide, for a feed-through conductor of electrical currents, a by-pass arrangement of simplified construction and small physical size.

A by-pass arrangement, in accordance with the invention, comprises a conductor of electrical currents and a conductive shield structure having an aperture through which the conductor projects. The arrangement further includes a transversely extending conductive electrode structure connected to the conductor but spaced from the shield. The electrode structure is shaped to provide with the shield and the conductor at least two parallel paths of such different lengths that signals of a preselected frequency are transmitted therethrough in phase opposition, thereby effectively to suppress transmission of signals of this frequency through the aperture.

For a better understanding of the present invention, together with other and further objects thereof, reference is had to the following description taken in connection with the accompanying drawings, and its scope will be pointed out in the appended claims.

Figure 4:
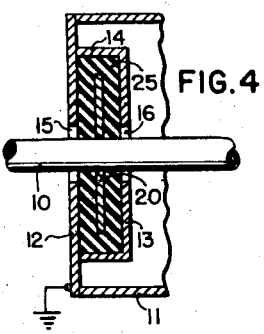
Figure 3:
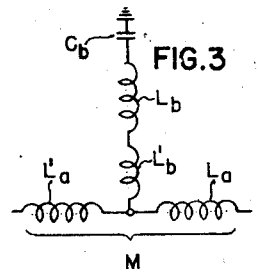
Figure 2:
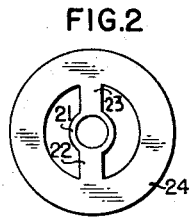
Figure 5:
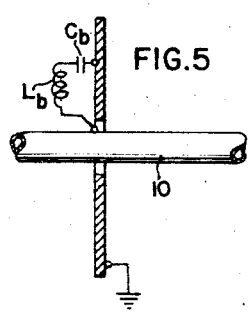

In the drawings, Fig. 1 is a cross-sectional view of a by-pass arrangement embodying the invention; Fig. 2 is a plan view of an electrode structure included in Fig. 1; Fig. 3 is a schematic circuit diagram representing the circuit arrangement of Fig. 1; Fig. 4 is a modification of the invention; Fig. 5 is a schematic diagram of a circuit analogous to the by-pass arrangement of Fig. 4; Figs. 6a–6g, inclusive, represent various forms of electrode structures suitable for use in the arrangements of Fig. 1 and Fig. 4; Figs. 7a and 7b as well as Figs. 8a and 8b represent modified forms of the invention; Fig. 9 comprises a filter arrangement including the present invention; while Fig. 10 is a schematic circuit representation of the filter of Fig. 9.

Referring now more particularly to Fig. 1, there is represented a by-pass arrangement embodying the invention and applied to a cavity resonator of the coaxial-line type. Since the construction of such a resonator is well understood in the art, the illustration includes only fragmentary showings of its inner cylindrical conductor 10 and outer hollow conductor 11 which are coaxially aligned and of such length as to provide a resonator of a desired electrical length. One end of the resonator is short-circuited for alternating currents by means of the by-pass arrangement of the invention. This arrangement comprises a conductive shield having an aperture through which the conductor 10 projects. As illustrated, the shield structure includes a first conductive member or disc 12 connected with the outer conductor 11 of the resonator and a second conductive member or disc 13 spaced from and substantially parallel to disc 12. A peripheral flange 14 connects discs 12 and 13 together to form a closed chamber or a cylindrical portion within the shield structure. Centrally located apertures 15 and 16 of discs 12 and 13 are aligned and permit conductor 10 to project through the described shield structure.

The by-pass arrangement also includes a transversely extending conductive electrode structure connected to conductor 10 but spaced from the shield structure and shaped to provide in conjunction with the shield and the conductor at least two parallel paths for signal waves guided by conductor 10. For the embodiment under consideration a planar electrode structure 20 is employed, being positioned within the chamber or cylindrical shield portion defined by discs 12 and 13 and of such size as to be spaced from the walls thereof. In the form illustrated in Fig. 2, electrode 20 is generally similar to a flattened wheel. It includes a hub 21 through which the electrode may be connected to conductor 10 and securely fixed in position thereon by soldering, welding, or brazing. A plurality of spaced spoke elements radiate from hub 21, two diametrically opposed spokes 22 and 23 being shown in Fig. 2. In view of the relationship of the electrode with respect to conductor 10, these spokes extend transversely of the conductor. The electrode also includes a closed continuous peripheral portion 24 of annular or arcuate configuration, shown in the form of a rim and supported by the spokes 22, 23.

The by-pass arrangement may be considered in the light of the signal-wave paths provided therethrough with the electrode construction of Fig. 2. Radio-frequency signal waves present within the cavity resonator and guided along conductor 10 to the by-pass arrangement may travel through either of two parallel paths. The first path is represented by the broken-line arrow W₁ in Fig. 1. It is the path provided by the portions of the outer periphery of conductor 10 between spokes 22 and 23 of electrode 20. This path, therefore, includes substantially only portions of the outer periphery of conductor 10, since the portions of hub 21 between the spoke elements may be neglected for the purposes of the present discussion. The second signal path available to radio-frequency waves guided by conductor 10 is of greater length. It is represented in Fig. 1 by the broken-line arrow W₂ and includes the peripheral surfaces of one spoke and the adjacent rim portion of electrode 20. The spokes and the rim of electrode are proportioned so that the length of the second or the longer path exceeds that of the first or shorter path by such an amount that signal waves of a selected frequency transmitted over the two paths are in phase opposition and cancel one another at the aperture 15. This cancellation prevents the transmission of signals of the selected frequency from being continued along conductor 10 beyond the by-pass arrangement. The selected frequency may be chosen to correspond with the operating frequency of the resonator. Therefore, if desired, the end of conductor 10 which projects beyond the by-pass arrangement may be directly coupled with a direct current source and the source is protected from the alternating current signals of the resonator.

Instead of dealing with the multiple wave paths considered in the immediately preceding paragraphs, the by-pass arrangement may be analyzed from the standpoint of an equivalent trap circuit, series-resonant at the frequency to be by-passed. This analysis may also conveniently include the effect of any inductive coupling which may exist between the portions of conductor 10 on opposite sides of disc 12. Assume, for example, that aperture 15 is substantially greater in diameter than the conductor 10 so that there may exist a mutual inductive coupling between the portions of the conductor which fall on opposite sides of disc 12. This coupling tends to induce signal currents of the frequency to be by-passed into the portion of conductor 10 desired to be protected. The electrode 20 may be proportioned to cancel the inductive coupling mentioned and thereby to perfect the by-passing.

The schematic circuit diagram of Fig. 3 is the approximate electrical equivalent of the described by-pass arrangement. The inductors $L_a$ and $L_a'$ represent the self-inductance of the portions of conductor 10 located on opposite sides of disc 12 and having a mutual inductance $M$. The spoke elements of electrode 20, for the purposes of the present analysis, may be considered as connected in parallel to provide a resultant inductance equal to the sum of a first inductor $L_b$ and a second series-connected inductor $L_b'$, the latter serving to cancel the mutual inductance $M$ of inductors $L_a$ and $L_a'$. The inductor $L_b$, in association with a condenser $C_b$ representing the distributed capacitance of the rim 24 with the shield structure, forms a series-resonant trap circuit at the frequency to be by-passed. Consequently, the compensating inductor $L_b'$ and the series-resonant trap circuit of elements $L_b$ and $C_b$ suppress the transmission of signals of the operating frequency of the resonator through the aperture 15 of the shield. This desired condition may be realized by trial, selecting the radius of electrode 20 to have a value considerably less than one-quarter of the wave length corresponding to the signal frequency to be suppressed.

The by-pass arrangement of Fig. 4 is generally similar to that of Fig. 1, corresponding components thereof being identified by the same reference characters. In Fig. 4 the shield apertures 15 and 16 are only slightly larger in diameter than conductor 10 so that there is no appreciable coupling between the portions of the conductor on opposite sides of disc 12 or disc 13. Additionally, a dielectric 25 different from air fills the chamber or cylindrical portion formed in the shield structure by discs 12 and 13. This embodiment, wherein the shield apertures are not substantially greater in diameter than conductor 10, is particularly desirable since it permits the proper radius of the electrode 20 to be closely estimated. Usually, this radius is less than one-quarter of the operating wave length. Again, the by-pass arrangement may be analyzed from the standpoint of multiple, parallel, signal-transmission paths through which the signal to be by-passed is transmitted in phase opposition or, alternatively, the analysis predicated upon a series-resonant trap circuit may be used. Thus, as shown in Fig. 5, the arrangement may be considered to be the equivalent of a trap circuit, comprising the inductor $L_b$, provided by the spoke elements of electrode 20, and a condenser $C_b$, representing the distributed capacitance of the rim of the electrode with the shield. A further feature of the Fig. 4 embodiment resides in the fact that the dielectric 25 may be selected to have such a dielectric constant that the by-pass arrangement has a very small physical size. This is especially significant in installations where space considerations are of material importance.

The electrode 20 may have any of a wide variety of forms as indicated by the modifications of Figs. 6a–6g, inclusive. In each case the electrode is a thin, planar structure. The construction of Fig. 6a features diametrically opposed spoke elements 22 and 23 radiating from hub 21 as in Fig. 2. The rim, however, is discontinuous, being provided by one arcuate section 25 supported by spoke 22 and a similar section 25' supported by spoke 23. For most applications, the length of any spoke and its associated rim arc, as measured along the central planes of these elements, is approximately equal to one-quarter of the propagating wave length in the dielectric between the electrode and the discs 12 and 13.

Figure 6A:
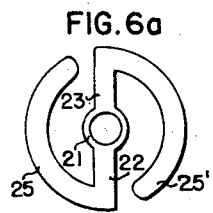
Figure 6B:
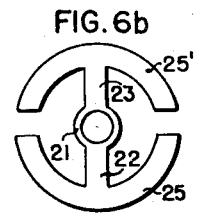

The electrode of Fig. 6b is similar to that of Fig. 6a, differing principally in the relative positions of arcs 25 and 25' with reference to the spokes 22 and 23. Specifically, each arc is centered with respect to its supporting spoke.

Figure 6C:
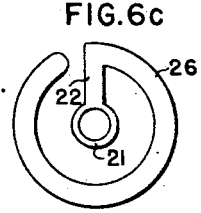

The electrode form in Fig. 6c utilizes but a single spoke 22 supporting a single peripheral section 26 in the form of a split ring. The conductor length along the spoke and split ring is approximately one-quarter wave length.

Figure 6D:
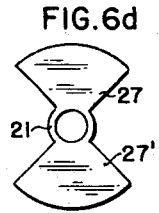

In Fig. 6d the planar electrode is a sectored disc. The electrode has a radius approximately equal to an odd integral multiple of one-quarter wave length and comprises a pair of diametrically opposed, similar sectors 27 and 27' supported by the hub 21.

Figure 6E:
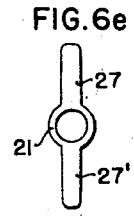

The planar electrode of Fig. 6e is essentially the same as that of Fig. 6d. The angle of sectors 27 and 27', however, is much reduced so that the sectors have the appearance of spokes. This modification effects by-passing over a smaller range of frequencies than the structure of Fig. 6d, in proportion to the smaller width of the sectors.

Figure 6F:
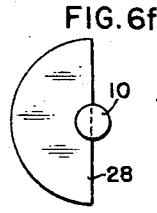

In the form represented by Fig. 6f, the electrode is a semicircular disc. This is equivalent to utilizing segments of the type shown in Fig. 6d, individually having an angle of 90 degrees but oriented to have a common side. The resulting electrode 28 may be supported in a transverse slot in axial conductor 10.

Figure 6G:
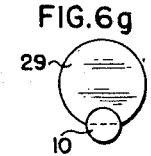

A circular electrode 29, roughly equivalent to the semicircular structure 28, is shown in Fig. 6g. It may be assembled to the conductor by being inserted into a transverse slot thereof. Any of the electrode structures of Figs. 6a–6g may be included in by-pass arrangements of the type illustrated in Figs. 1 and 4, whether air or some other dielectric is used. In any application, the electrode provides parallel paths over which signal waves of a preselected frequency are transmitted. The path lengths are adjusted by appropriate proportioning of the electrode so that the signal waves arrive at shield aperture 15 in phase opposition, whereby cancellation is effected. Any expression in the foregoing description, which relates a dimension in the electrode structure to wave length, refers to the propagating wave length in the dielectric of the by-pass for the signal frequency to be suppressed.

The arrangement of Fig. 7a is used to reduce the size or to by-pass signals of lower frequencies. Here, disc 13 has a centrally located recessed portion 17 which is connected with disc 12 and apertured to accommodate conductor 10. The outer peripheral portion of disc 13 is spaced from disc 12. The electrode structure includes spokes 30 and 31 proportioned to provide an increased inductance. The spokes support a rim 32 which has a flange portion 33, projecting into the space between discs 12 and 13. The longer wave path in this arrangement is indicated by broken-line arrow $W_3$ and the shorter path is represented by the arrow $W_1$.

The electrode structure of the Fig. 7b embodiment has a rim or pheripheral portion 35 supported by transversely extending spokes 36, 37. The rim 35 has the configuration of a toroid. It has an appreciable longitudinal dimension, that is, a dimension in the direction of the axis of conductor 10 and is spaced from the walls of the cylindrical portion of the shield defined by shield sections 12 and 13.

In Fig. 8a the shield structure includes a single, conductive disc 40 connected with the outer or shield conductor 11 of the cavity resonator. Disc 40 has an annular longitudinally extending flange 41, defining an aperture through which conductor 10 projects. The electrode structure is positioned within and is of such size as to be spaced from flange 41. It has spokes 42, 43 supporting a flat longitudinally extending rim 44 which may have a longitudinal dimension approximately equal to that of flange 41 of disc 40. A dielectric material 45 is disposed within the space between rim 44 of the electrode structure and flange 41 of the shield.

In Fig. 8b, the shield structure connected with conductor 11 has portions 50, 51, and 52 arranged to form a hollow cylindrical portion through which conductor 10 and the electrode structure connected thereto extend. This electrode structure includes transversely extending spokes 53, 54 which support a rim 55 in the form of a thin, hollow, cylindrical shell. The shell is spaced from the cylindrical portion of the shield structure, providing a multiplicity of parallel paths for signals of the frequency to be suppressed. One such path is directly along the outer surfaces of conductor 10 located between successive spokes of the electrode structure. Another and longer path includes the outer surface of the electrode shell 55. The last-mentioned path is proportioned to transmit signals of the selected frequency in phase opposition with signals of the same frequency transmitted through the first-described path. Consequently, cancellation results, as indicated above, to suppress transmission of such signals through the cylindrical portion 50—51—52 of the shield structure.

The filter arrangement of Fig. 9 may be considered to include series-resonant shunt traps of the type represented schematically in Fig. 5 and an intermediate series-connected parallel-resonant trap. Structurally, it has a shield 11 including similar spaced conductive discs 60 and 61 connected together at their opposite ends and centrally apertured to receive conductor 10. Two transversely extending planar electrode structures 62 and 63 are connected with conductor 10 and spaced respectively from discs 60 and 61. The electrode structures may have any of the forms represented in Figs. 2 and 6a–6g, inclusive.

In analyzing the filter arrangement, it is convenient initially to discuss only disc 60 of the shield structure and the electrode 62. This much of the filter is substantially identical with the by-pass arrangement of Fig. 4, assuming the disc 13 of the latter arrangement to be omitted, and effects by-passing in the same manner. Consequently, disc 60 and electrode 62 effectively constitute a trap for the frequency to be by-passed. This trap is shown schematically in Fig. 10. It consists of an inductor $L_b$, representing the inductance of the electrode structure, and a condenser $C_b$ which is the distributed capacitance of the electrode and shield structures. In like manner, the second electrode 63 in conjunction with the remaining shield disc 61 may be shown to constitute a second series-resonant trap circuit. This circuit is designated by the elements $L_b''$ and $C_b''$ in Fig. 10. The shield discs 60 and 61, per se, form a quarter-wave resonant chamber, having an electrical length equal to one-quarter of the wave length corresponding to the frequency of the signal to be by-passed. This chamber presents impedance characteristics analogous to those of a parallel-resonant circuit and is represented in Fig. 10 by the parallel arrangement of an inductor $L_c$ and a condenser $C_c$. The elements $L_c$ and $C_c$ correspond to the distributed inductance and distributed capacitance, respectively, of the resonant chamber. This chamber, being connected intermediate the series-resonant traps, completes a $\pi$-type filter network.

By-pass arrangements in accordance with the invention are effective at operating frequencies at which signal transmission is predominately along the skin or peripheral surfaces of the conductive elements to which the signal may be applied. Such by-pass arrangements are especially useful for apparatus operating at ultra-high frequencies.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A by-pass arrangement comprising, a conductor of electrical currents, a conductive shield structure having an aperture through which said conductor projects, and a transversely extending conductive electrode structure connected to said conductor but spaced from said shield and shaped to provide with said shield and said conductor at least two parallel paths of such different lengths that signals of a preselected frequency are transmitted therethrough in phase opposition, thereby effectively to suppress transmission of signals of said frequency through said aperture.

2. A by-pass arrangement comprising, a conductor of electrical currents, a shield structure including two spaced and substantially parallel conductive members connected together and having aligned apertures through which said conductor projects, and a transversely extending conductive electrode structure connected to said conductor but projecting into the space between said members of said shield and shaped to provide with said members and said conductor at least two parallel paths of such different lengths that signals of a preselected frequency are transmitted therethrough in phase opposition, thereby effectively to suppress transmission of signals of said frequency through said apertures.

3. A by-pass arrangement comprising, a conductor of electrical currents, a shield structure including two spaced and substantially parallel conductive members connected together to form a closed chamber and having aligned apertures through which said conductor projects, and a transversely extending conductive electrode structure connected to said conductor and positioned within said chamber but spaced from the walls thereof and shaped to provide with the walls of said chamber and said conductor at least two parallel paths of such different lengths that signals of a preselected frequency are transmitted therethrough in phase opposition, thereby effectively to suppress transmission of signals of said frequency through said apertures.

4. A by-pass arrangement comprising, a conductor of electrical currents, a conductive shield structure having a hollow cylindrical portion through which said conductor projects, and a transversely extending conductive electrode structure connected to said conductor and positioned in but spaced from the walls of said cylindrical portion of said shield and shaped to provide with said cylindrical portion and said conductor at least two parallel paths of such different lengths that signals of a preselected frequency are transmitted therethrough in phase opposition, thereby effectively to suppress the transmission of signals of said frequency through said cylindrical portion of said shield.

5. A by-pass arrangement comprising, a conductor of electrical currents, a conductive shield structure having a hollow cylindrical portion through which said conductor projects, and a conductive electrode structure positioned in said cylindrical portion of said shield, including a plurality of spaced spokes connected to and extending transversely of said conductor, and including a longitudinally extending peripheral portion supported by said spokes and spaced from the walls of said cylindrical portion of said shield, said spokes and said peripheral portion of said electrode structure being proportioned to provide with said shield and with said conductor at least two parallel paths of such different lengths that signals of a preselected frequency are transmitted therethrough in phase opposition, thereby effectively to suppress the transmission of signals of said frequency through said cylindrical portion of said shield.

6. A by-pass arrangement comprising, a conductor of electrical currents, a conductive shield structure having an aperture through which said conductor projects, and a transversely extending conductive electrode structure connected to said conductor but spaced from said shield and shaped to provide a first signal path including substantially only a portion of the outer periphery of said conductor and a second parallel path including the peripheral surfaces of said electrode structure and of such greater length than said first path that signals of a preselected frequency are transmitted through said paths in phase opposition, thereby effectively to suppress transmission of signals of said frequency through said aperture.

7. A by-pass arrangement comprising, a conductor of electrical currents, a conductive shield structure having an aperture through which said conductor projects, and a planar conductive electrode structure spaced from said shield, including a pair of diametrically opposed spoke elements connected to and extending transversely of said conductor, and including a peripheral portion of arcuate configuration supported by said spoke elements, said spoke elements and said peripheral portion of said electrode structure being proportioned to provide with said conductor and said shield at least two parallel paths of such different lengths that signals of a preselected frequency are transmitted therethrough in phase opposition, thereby effectively to suppress transmission of signals of said frequency through said aperture.

8. A by-pass arrangement comprising, a conductor of electrical currents, a conductive shield structure having an aperture through which said conductor projects, and a planar conductive electrode structure spaced from said shield, including a pair of diametrically opposed spoke elements connected to and extending transversely of said conductor, and including a closed continuous peripheral portion of arcuate configuration supported by said spoke elements, said spoke elements and said peripheral portion of said electrode structure being proportioned to provide with said conductor and said shield at least two parallel paths of such different lengths that signals of a preselected frequency are transmitted therethrough in phase opposition, thereby effectively to suppress transmission of signals of said frequency through said aperture.

9. A by-pass arrangement comprising, a conductor of electrical currents, a conductive shield structure having an aperture through which said conductor projects, and a transversely extending planar conductive electrode structure having a maximum dimension in a plane transverse to said conductor approximately equal to an odd integral multiple of one-quarter wave length corresponding to a preselected signal frequency, connected to said conductor but spaced from said shield, and shaped to provide with said shield and said conductor at least two parallel paths of such different lengths that signals of said frequency are transmitted therethrough in phase opposition, thereby effectively to suppress transmission of signals of said frequency through said aperture.

10. A by-pass arrangement comprising, a conductor of electrical currents, a conductive shield structure having an aperture through which said conductor projects, and a transversely extending planar conductive electrode structure comprising a segmented disc having a radius approximately equal to an odd integral multiple of one-quarter wave length corresponding to a preselected signal frequency, connected to said conductor but spaced from said shield, and shaped to provide with said shield and said conductor at least two parallel paths of such ifferent lengths that signals of said frequency are transmitted therethrough in phase opposition, thereby effectively to suppress transmission of signals of said frequency through said aperture.

11. A by-pass arrangement comprising, a conductor of electrical currents, a conductive shield structure having an aperture through which said conductor projects, and a transversely extending planar conductive electrode structure comprising a segmented disc having a radius approximately equal to an odd integral multiple of one-quarter wave length corresponding to a preselected signal frequency, said segmented disc comprising a pair of diametrically opposed and similar sectors connected to said conductor but spaced from said shield and providing with said shield and said conductor at least two parallel paths of such different lengths that signals of said frequency are transmitted therethrough in phase opposition, thereby effectively to suppress transmission of signals of said frequency through said aperture.

HAROLD A. WHEELER.

REFERENCES CITED

The following references are of record in the file of this patent:

UNITED STATES PATENTS

| Number | Name | Date |
| --- | --- | --- |
| 2,173,908 | Kolster | Sept. 26, 1939 |
| 2,258,148 | Schussler | Oct. 7, 1941 |
| 2,392,664 | Gurewitsch | Jan. 8, 1946 |